(12) United States Patent
Jiang et al.

(10) Patent No.: US 12,501,904 B2
(45) Date of Patent: Dec. 23, 2025

(54) METHOD OF PREPARING THERMALLY INHIBITED GRAIN

(71) Applicant: CORN PRODUCTS DEVELOPMENT, INC., Westchester, IL (US)

(72) Inventors: Hongxin Jiang, Bridgewater, NJ (US); Christopher Lane, Bridgewater, NJ (US); Tarak Shah, Bridgewater, NJ (US)

(73) Assignee: Corn Products Development, Inc., Westchester, IL (US)

( * ) Notice: Subject to any disclaimer, the term of this patent is extended or adjusted under 35 U.S.C. 154(b) by 499 days.

(21) Appl. No.: 17/983,529

(22) Filed: Nov. 9, 2022

(65) Prior Publication Data

US 2023/0069060 A1    Mar. 2, 2023

Related U.S. Application Data

(63) Continuation-in-part of application No. 17/240,923, filed on Apr. 26, 2021, now abandoned, which is a continuation of application No. 15/451,081, filed on Mar. 6, 2017, now abandoned.

(51) Int. Cl.
*A23L 7/10*      (2016.01)
*A21D 6/00*      (2006.01)
*A21D 13/047*    (2017.01)

(52) U.S. Cl.
CPC .......... *A21D 6/003* (2013.01); *A21D 13/047* (2017.01); *A23L 7/198* (2016.08)

(58) Field of Classification Search
None
See application file for complete search history.

(56) References Cited

U.S. PATENT DOCUMENTS

| | | |
|---|---|---|
| 2,585,978 A | 2/1952 | George et al. |
| 3,974,298 A | 8/1976 | Cauvain et al. |
| 4,737,371 A | 4/1988 | Bookwalter |
| 5,017,395 A | 5/1991 | McCaskill et al. |
| 5,066,506 A | 11/1991 | Creighton et al. |
| 5,472,730 A | 12/1995 | Saikusa et al. |
| 5,718,770 A | 2/1998 | Shah et al. |
| 6,010,574 A | 1/2000 | Jeffcoat et al. |
| 6,221,420 B1 | 4/2001 | Thomas et al. |
| 8,846,128 B2 | 9/2014 | Schilling et al. |
| 9,775,370 B2 | 10/2017 | Yanamoto |
| 10,849,344 B2 | 12/2020 | Yanamoto |
| 10,980,264 B2 | 4/2021 | Lane et al. |
| 2004/0105921 A1 | 6/2004 | Kim et al. |

(Continued)

FOREIGN PATENT DOCUMENTS

| | | |
|---|---|---|
| EP | 0710670 | 8/1996 |
| EP | 1281721 | 5/2003 |

(Continued)

*Primary Examiner* — Lien T Tran
(74) *Attorney, Agent, or Firm* — Jason Grauch (57) ABSTRACT

A method of thermally inhibiting starch or flour is provided. The method involves thermally or non-thermally dehydrating a grain to anhydrous or substantially anhydrous, and then heat treating this dehydrated grain. The heat treated dehydrated grain is then milled, producing thermally inhibited flour and/or starch. Using this method, the shelf life of the resulting thermally inhibited whole grain flour is extended compared whole grain flours that are thermally inhibited after milling.

13 Claims, 5 Drawing Sheets

(56) References Cited

U.S. PATENT DOCUMENTS

| | | |
|---|---|---|
| 2008/0311274 A1 | 12/2008 | Xu et al. |
| 2012/0009323 A1 | 1/2012 | Xu et al. |
| 2012/0189756 A1 | 7/2012 | Xu et al. |
| 2014/0099424 A1 | 4/2014 | Schilling et al. |
| 2015/0164113 A1 | 6/2015 | Moroni et al. |
| 2018/0249720 A1 | 9/2018 | Jiang et al. |

FOREIGN PATENT DOCUMENTS

| | | |
|---|---|---|
| JP | H07213252 | 8/1995 |
| JP | H09503549 | 4/1997 |
| JP | 2004305205 | 11/2004 |
| JP | 2009543561 | 12/2009 |
| JP | 2015522297 | 8/2015 |
| WO | WO9603891 | 2/1996 |
| WO | WO9640793 | 12/1996 |
| WO | 98/11788 | 3/1998 |
| WO | 00/73353 | 12/2000 |
| WO | 2008006171 | 1/2008 |
| WO | 2012124817 | 7/2014 |
| WO | 2018069535 | 4/2018 |
| WO | 2018112383 | 6/2018 |

METHOD OF PREPARING THERMALLY INHIBITED GRAIN

This application is a CIP of Ser. No. 17/240,923 filed on Apr. 26, 2021, Now Abandon; application Ser. No. 17/240,923 is a CON of Ser. No. 15/451,081 filed on Mar. 6, 2017, Now Abandon.

BACKGROUND OF THE INVENTION

Field of the invention: The present invention is directed towards improved thermally inhibited flour and methods of making the same. More specifically, the method dehydrates the whole grain and then heats the grain at sufficient temperature and for sufficient time to produce a thermally inhibited flour when the grain is milled.

Thermally inhibited starch is known, but there is a market for thermally inhibited flour. But the process for making such flours has proved problematic. Flour contains proteins and fats, in addition to the starch. It is known that the fats oxidize over time producing as their major product hexanal, which produces off tastes in flour. Applicants, additionally, discovered that high heat and long heating times necessary to thermally inhibit flour, by itself, oxidizes the lipids. So that thermally inhibited flours have higher hexanal content than non-thermally inhibited flours, even immediately after milling.

SUMMARY OF THE INVENTION

Disclosed herein is a method for thermally inhibiting flour having reduce hexanal content, both initially and over time, than thermally inhibited flours of the prior art. In embodiments, the method applies heat-treatment to the whole grain prior to milling. In embodiments, the method comprises dehydrating the grain so that the moisture content of grain is less than about 5% of the total weight of the grain. The dehydration step will occur at a temperature of between about 80° C. and about 100° C. for between about 1 hour and about 24 hours. The grain is then heat treated at a second temperature between about 120° C. to about 180° C. for between about 1 hour and 20 hours. The dehydrated, heat treated grain is then milled to make thermally inhibited whole grain flour. Optionally, in other embodiments, the pH of the whole grain is adjusted prior to dehydration. The pH may be adjusted by steeping the grain in a slightly acidic solution (i.e. pH between about 5 and about 7) at temperature between about 50° C. and about 70° C. for between 1 and 24 hours. The pH adjusted grain is then dried to a moisture content of less than about 12% (w/w) at about 55° C. for between about 1 hour and 12 hours. The dried grain is then dehydrated, heat treated and milled to make thermally inhibited whole grain flour.

Whole grain flour made according to the disclosed method is thermally inhibited and contains less hexanal after zero days storage than flour that is thermally inhibited after milling. In one embodiment the thermally inhibited grain flour contains at least 50% less hexanal than flour thermally inhibited after milling after zero days' storage. In other embodiments flour thermally inhibited grain flour contains at least 60% less hexanal than flour thermally inhibited after milling after zero days' storage. In other embodiments flour made from thermally inhibited grain contains at least 80% less hexanal after milling than flour thermally inhibited after milling after zero days' storage. In other embodiments flour made from thermally inhibited grain contains about 85% less hexanal after milling than flour thermally inhibited after milling after zero days' storage. In embodiments this reduction in hexanal persists so that the thermally inhibit grain flour at 50%, more preferable 60%, more preferable 80%, and most preferably about 85% less hexanal than thermally inhibited flour after 2 or four weeks storage.

Thermally inhibited grain flour made by the claimed method also has improved shelf life compared to non-thermally inhibited flour. In one embodiment thermally inhibited grain flour contains at least about 10% less hexanal after two weeks' storage at room temperature than non-inhibited whole grain flour, preferably at least about 30% less, and more preferably about 40% less. In another embodiment thermally inhibited whole grain flours made by the disclosed methods contains at least about 10% less hexanal after four weeks' storage at room temperature than non-inhibited whole grain flour, preferably at least about 40% less, more preferably at least about 45% less, and more preferably about 50% less.

Also disclosed herein are food products made using the thermally inhibited flour prepared by the disclosed methods.

DETAILED DESCRIPTION OF THE INVENTION

Disclosed herein are methods for heat treating a whole grain that, upon milling, yields thermally inhibited grain flour with less hexanal content than flour that is thermally inhibited after milling. This reduction of hexanal persists over time and the thermally inhibited grain flour has less hexanal content than thermally inhibited flour after storage at room temperature for 2 and 4 weeks. The thermally inhibited grain flour also has lower hexanal content than non-thermally inhibited whole grain flour after 0, 2 and 4 weeks after storage.

As used herein thermal inhibition is a process whereby a starch, or flour or cereal grain containing that starch, is heated to a temperature above the starch's gelatinization temperature in a low moisture environment so that the starch does not pregelatinize.

A starch or flour is referred to as inhibited if, when dispersed and/or cooked in water, it exhibits the textural and viscosity properties characteristic of a chemically-cross-linked starch or flour, for example a high degree of stability even in exceptionally harsh conditions. As an exemplary embodiment thermally inhibited flours made according to the disclosed methods exhibit no viscosity break down of solution containing 5% solids after being held at 95° C. and pH 3 for 15 minutes.

As used herein, thermally inhibited starch and thermally inhibited flour mean respectively, a starch or flour that has been thermally inhibited after milling.

As used herein, a thermally inhibited grain is a whole grain that is thermally inhibited prior to milling. The flour made from such grain is thermally inhibited grain flour.

As used herein, a native grain is one as it is found in nature. Suitable native grains for use with the disclosed methods are any cereal grain, including but not limited to, corn, barley, wheat, rice, sorghum, waxy maize, waxy rice, waxy barley, waxy sorghum, cereal grains containing high amylose, and the like.

As used herein a dehydrated grain is a grain that has had its moisture level reduced to be substantially anhydrous or anhydrous.

As used herein a whole grain that has been dehydrated to be substantially anhydrous has a moisture level of less than 5% (w/w).

As used herein a whole grain that has been dehydrated to be anhydrous has a moisture level of less than 2% (w/w).

The disclosed whole grain flours are made according to the various methods disclosed herein. According to one embodiment of the disclosed method, native grains are heat treated by first dehydrating the grain at a first temperature for a time that is sufficient to dehydrate the grain. The grain is then heat treated at a second temperature for a time sufficient that the flour obtained from the grain is thermally inhibited. The thermally inhibited grain is then milled to make thermally inhibited grain flour. In other embodiments of the disclosed methods the pH of the grain is adjusted by steeping the grain in a mildly acidic, buffered solution prior to the dehydration step. Following steeping the grain is dried, and then dehydrated and heat treated to make a thermally inhibited grain. The grain is then milled to make thermally inhibited flour.

Generally the times and temperatures used to thermally inhibit the grain will depend on the desired amount of inhibition of the grain. Following are described specific embodiments and principles for carrying out the invention specifically describing the dehydrating step, the heat treatment step, and the optional steeping step.

In embodiments, the dehydration step reduces the moisture content of the dehydrated grain to less than about 5% (w/w). In other embodiment the grain is dehydrated to less than about 2%. In embodiments where the grain is not pH adjusted prior to dehydration. The dehydration may be done by any method suitable for dehydrating the grain for example by freeze drying, solvent drying, or heat drying.

In embodiments, the grain is dehydrated at temperatures of about 100° C. or less, and more preferably at a temperature or range of temperatures from about 80° C. to about 100° C. The length of time that the dehydration step runs depends on the amount of dehydration desired, and will vary greatly based on the amount of drying desired and the temperature of the step. In embodiments of the disclosed method, the dehydration step can run for up to about 24 hours, but more typically it will run for about between 0.5 hours and 1 hour.

In embodiments the heat treatment step heats the dehydrated grain to thermally inhibit it. The heat treatment step is run at a second temperature for a time sufficient that the flour obtained from the grain is thermally inhibited. The second temperature is higher than the first temperature. In embodiments the second temperature is between 120° C. and 180° C., more preferably between about 130° C. and about 165° C. The heating step will run for various amounts of time depending on the amount of thermal inhibition desired. In embodiments the heating step will run for up to 20 hours. In embodiments of the disclosed method the heating step will run for between about 1.0 hour and 20 hours. More typically not more than 6.0 hours. In other embodiments the heating step is 1, 1.5 or 2.0 hours.

In some embodiments a steeping step is used to adjust the pH of the grain so that it is slightly acidic. The steeping step is run at pH mildly acidic pH, preferably about 5.5 to about 6.5. Conventional acids, such as hydrochloric, sulfuric, phosphoric, carbonic, and acetic acid may be used. The solution is typically buffered to maintain pH during the steeping process. The grain is added to the buffered solution, in a ratio of about 3.0 parts solution to about 1.0 parts grain.

The grain is steeped for between about 1 hour and about 24 hours at a temperature of between about 50° C. and about 70° C. Excess buffer solution is removed, and the grain is dried to a moisture content of about 12% or less at temperature of about 40° C. to about 70° C. over a period of between 1 hour and 12 hours. This drying step is distinct from the dehydration and heat treatment steps. The dried, pH adjusted grain is then dehydrated and heat treated according to the disclosed methods.

In any embodiment described in this specification the grain may be polished before steeping in buffer solution. Polished grain is a commonly understood term in the art, but means at least the removal of hull, bran, and germ from the grain. In at least some embodiments the buffer is a citrate buffer such as potassium citrate or tripotassium citate or sodium citrate. In any embodiment, citrate buffer is added in an amount less than about 5%, but in an amount more than 0.1% (by weight of the slurry).

In some embodiments, sodium citrate, (in amounts between 0.1% and 5% by weigh of the slurry) can be generated in situ by passing a grain slurry through a citric acid solution. The pH of the grain may, but does not need to, drop during the citric acid treatment. Notably, the citric acid treatment is separate from pH adjustment steps described in this specification. During the citric acid treatment the grains' pH is kept at a pH above pH 5 to prevent the starch from hydrolyzing and to prevent forming starch citrate. It is intended that grain soaks in a slurry containing citric acid so that citric acid penetrates the grain. Sodium hydroxide is added to this slurry, preferably after the grain has soaked in a citric acid containing slurry. Sodium hydroxide may be added to help maintain the pH of grain slurry above pH 5 as citric acid is added but most of all sodium hydroxide used is added after the grain has soaked in the citric acid containing slurry. As sodium hydroxide is added the pH of the slurry increases. The pH is monitored so that that the pH is kept below pH 9.5 or preferably below pH 9, or more preferably below pH 8. Grain is soaked in the slurry comprising citric acid and sodium hydroxide to allow sodium citrate to form in the grain in amounts greater than at least about 0.1% (wt. of the grain). In any embodiment of the methods described in this specification, following sodium citate formation in the grain the pH of the grain is adjusted so that the grain is mildly acidic, e.g. having pH from about 5.5 to about 6.5.

The disclosed embodiments use, relative to each other, low temperature for drying, an intermediate temperature for dehydration, and high temperature for heat treatment. Note, however, that although the steps are called drying, dehydration, and heat treatment, and that the steps occur at different temperatures, results of the steps may overlap.

In embodiments the drying, dehydrating, and heat treating steps are part of continuous process. In embodiments the grain is held a first temperature within the range for drying for a period sufficient to dry the grain, then the temperature is ramped to a second temperature within the dehydration range for a period sufficient to dehydrate the grain, and then temperature is ramped to a third temperature within the heat treating range for sufficient time to thermally inhibited the grain. The ramp time will generally be between 5 and 30 minutes. In some embodiments the ramp is done over 15 minutes. In other embodiments the ramp is done over 10 minutes. In other embodiments the drying, dehydrating, and heat treating steps are part of a continuous ramp starting at ambient temperature. In such embodiments the temperature passes through the temperature range for the drying step over a period sufficient to dry the grain, through the dehydrating range over a period of time sufficient to dehydrate the grain. The temperature continues to increase until it reaches a desired end temperature within the range for heat treating the grain. The grain is then subject to heat treatment for sufficient time to thermally-inhibited the grain. Variations on these processes are within the skill in the art and may be used as appropriate.

Useful equipment for dehydration and heat treatment (i.e., thermal inhibition) include any industrial oven (e.g., conventional ovens, microwave ovens, dextrinizers, fluidized bed reactors and driers, mixers and blenders equipped with heating devices, and other types of heaters), provided that the equipment is fitted with a vent to atmosphere or some other dehumidifying mechanism so that moisture does not accumulate and precipitate onto the grain. Preferably, the equipment is modified to remove water vapor from it (e.g., by vacuum or blower for sweeping air from the head-space of the apparatus, by use of a fluidizing gas, or with a dehumidifying device). Heat treatment can be accomplished in the same equipment in which dehydration occurs, and most conveniently is continuous with the dehydrating step. When dehydration is continuous with heat treatment (e.g., when the dehydrating and heat treating apparatus is a fluidized bed reactor or drier), dehydration occurs simultaneously while bringing the equipment up to the final heat treatment temperature.

Once thermal inhibition of the grain is completed, the inhibited grain can then be dry-milled or tempered and wet milled. The flour may be kept as whole grain flour, or the germ components may be removed from the flour according to standard methods. Applying a thermal inhibition process to grains as described in this specification yields various operational advantages compared to a traditional process for thermally inhibiting flour or starch.

Flour is traditionally thermally inhibited by drying milling grain and then applying a thermal inhibition process to the flour. The process darkens the flour (perhaps by a heat induced Maillard reaction). Also, thermally inhibited flours tend to spoil more quickly than untreated flours (perhaps the heating process accelerates fatty acid degradation). It is observed, as described in this specification, that thermally inhibited flour made by applying a thermal inhibition process to a grain has reduced hexanol (a volatile organic molecule associated with rancid odor and taste) than thermally inhibited flour made by applying a thermal inhibition process to the flour.

Starch is traditionally thermally inhibited by wet milling a grain, to separate protein from starch, then applying thermal inhibition process to the starch. Following inhibition the starch is remoistened or washed following the thermal inhibition process, at least to return the thermally inhibited starch to an equilibrium moisture content. In at last some embodiments of a process for making a thermally inhibited starch described in this specification a thermal inhibition process (as described in this specification) is applied to grain, the grain is then wet milled to obtain a thermally inhibited starch. Advantageously the starch is remoistened and washed in the wet milling process eliminating the water use, energy, use and cost associated with washing or remoistening a starch after a thermal inhibition process is applied to the starch.

Additionally, the starch can be removed from the flour according to standard methods. As described herein the flours and starches obtained by treating grains according to the disclosed methods exhibit viscosity profiles similar to flours and starches that are thermally inhibited after milling and or separation. Accordingly, the disclosed methods yield thermally inhibited starch and/or flour. The thermally inhibited grain starches and flours made according to the disclosed methods can then be further modified by enzymes, heat or acid conversion, oxidation, phosphorylation, etherification (particularly, hydroxyalkylation), esterification and/or chemical crosslinking as required for end use application. In embodiments the thermally inhibited grain flour is not further modified.

The level of thermal inhibition of the flour made from the disclosed methods can be determined by the viscosity profile of pastes created from the starch. Examples of profiles are provided in FIGS. 1 through 6 which depict various Brabender pasting profiles of starch solutions (5% solids-in-water, 92° C. to 95° C., pH 3 and a paddle speed of 150 RPM).

Figure 1:
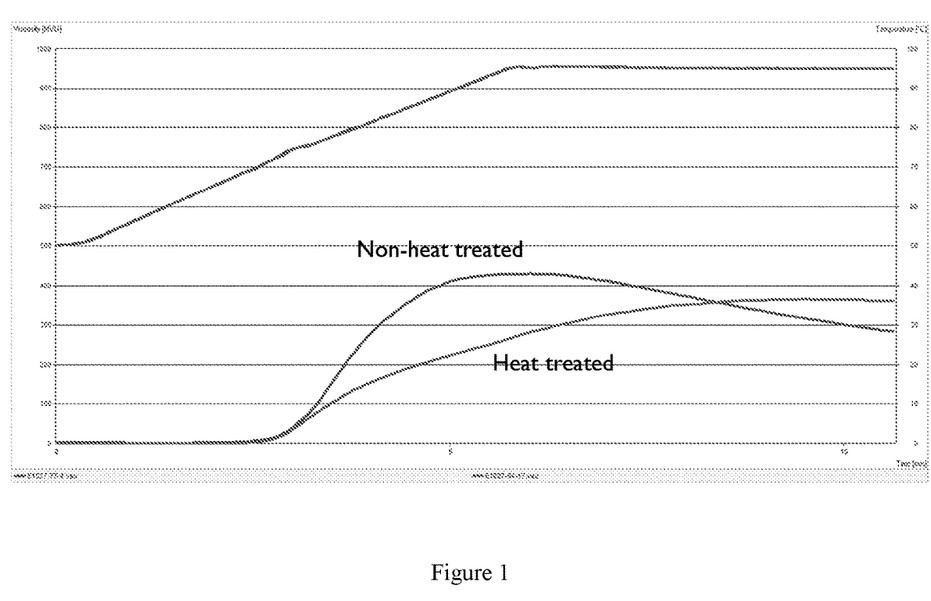
FIG. 1 illustrates viscosity profiles of thermally inhibited grain flour heat treated for different time periods.

FIG. 1 compares waxy rice grain flour treated according to the disclosed method (heat treatment to anhydrous grain at 140° C. for 120 minutes) and flour from non-inhibited waxy rice flour. As seen the non-inhibited waxy rice flour has a higher peak viscosity, and lower ending viscosity than the flour from the thermally inhibited grain, which has no peak viscosity. This indicates a thermally inhibited grain because of 1) the lower viscosity compared to the peak viscosity of the non-inhibited grain suggests that the granules of the thermally inhibited grain flour resisted expansion during heating in solution, and 2) the higher viscosity compared to the end viscosity of the non-inhibited flour suggest that the granules of the thermally inhibited grain flour resisted breaking down during extended heating.

Figure 2:
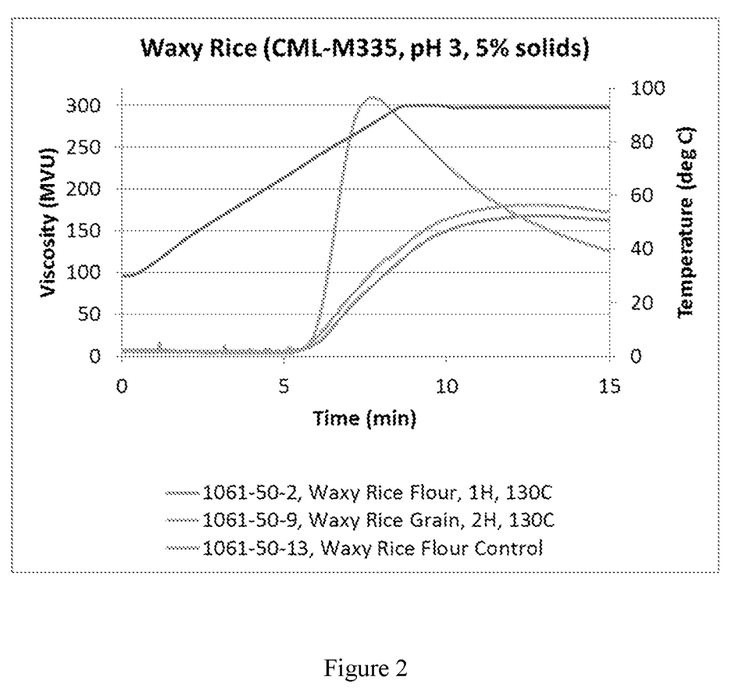
FIG. 2 illustrates viscosity profiles of non-inhibited waxy rice flour, thermally inhibited grain flour made from waxy rice and thermally inhibited flour made from waxy rice.
Figure 3:
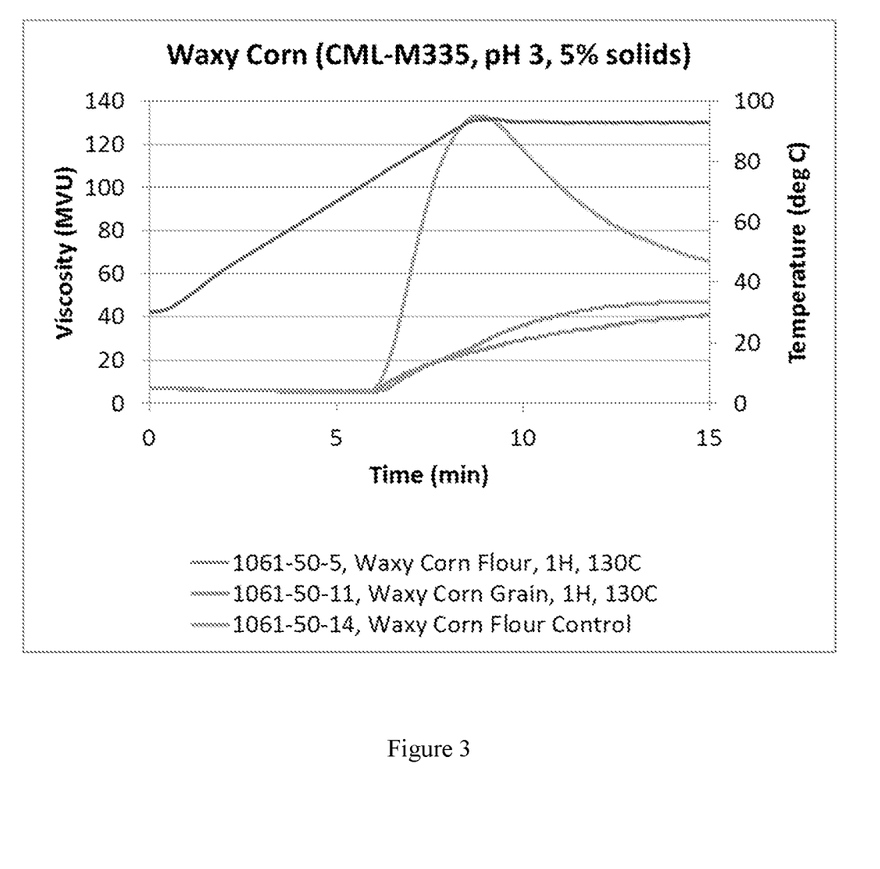
FIG. 3 illustrates viscosity profiles of non-inhibited waxy corn flour, and thermally inhibited grain flour made from waxy corn and thermally inhibited flour made from waxy corn.
Figure 4:
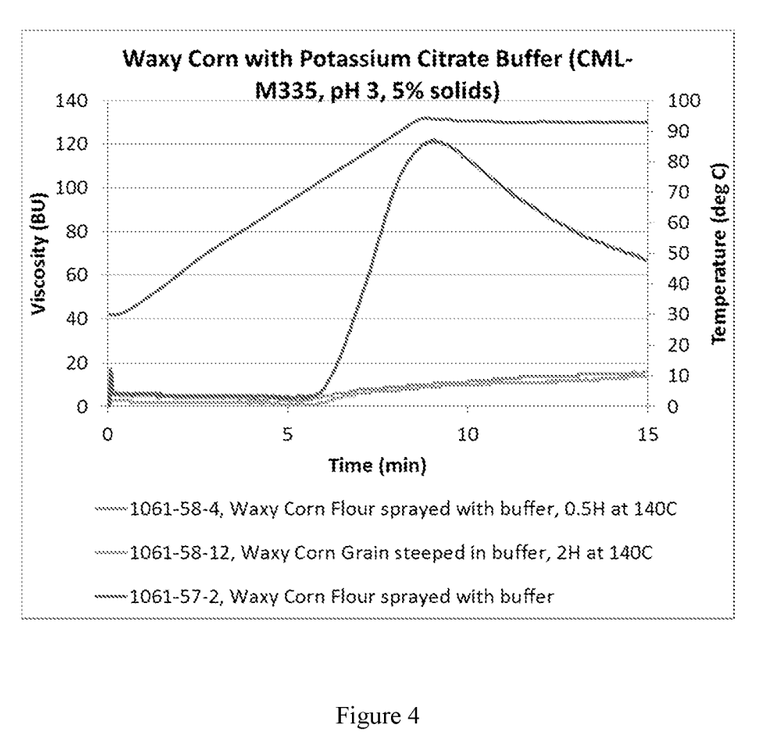
FIG. 4 illustrates the viscosity profiles of pH adjusted non-inhibited waxy corn flour and pH adjusted thermally inhibited grain flour made from waxy corn and thermally inhibited corn flour made from waxy corn.
Figure 5:
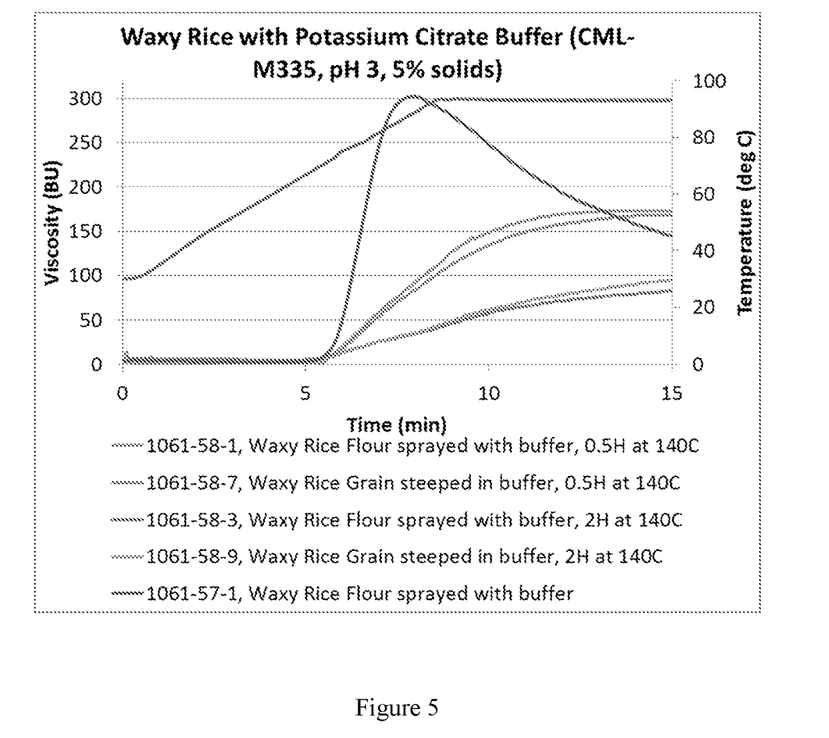
FIG. 5 illustrates the viscosity profiles of pH adjusted non-inhibited waxy rice flour and pH adjusted thermally inhibited grain flour made from waxy rice and thermally inhibited flour made from waxy rice.

FIGS. 2 and 3 provide the viscosity profiles of thermally inhibited grain flour (i.e. milled after thermal inhibition) made from waxy rice and waxy corn. As shown, although generally being heat treated for longer time, the thermally inhibited grain flour has viscosity profiles that mimicked thermally inhibited flour (i.e. milled before thermal inhibiting) made from waxy rice and waxy corn. Similarly, as shown in FIGS. 4 and 5, the pH adjusted thermally inhibited grain flour exhibits viscosity profiles similar to pH adjusted thermally inhibited flour.

In embodiments, the thermally inhibited grain flour has less hexanal than to non-inhibited whole grain flour after 0, 2, and 4 weeks storage. Hexanal is a product of fatty acid oxidation, it gives flour an off taste, in other words it indicates the level of oxidative rancidity in flour. Hexanal levels can be measured by headspace gas chromatograph coupled with flame ionization detection (FID). In one embodiment thermally inhibited whole grain flour made by the disclosed methods contain at least about 10% less hexanal after two weeks' storage at room temperature than non-inhibited whole grain flour, preferably at least about 30% less, and more preferably about 40% less. In another embodiment thermally inhibited whole grain flours made by the disclosed methods contain at least about 10% less hexanal after four weeks' storage at room temperature than non-inhibited whole grain flour, preferably at least about 40% less, more preferably at least about 45% less, and more preferably about 50% less. In other embodiments of the invention, waxy corn flour made according to the disclosed methods has hexanal values of less than about 1.8 ppm after between two and four weeks storage, preferably less than about 1.0 ppm and, more preferably less than about 0.9 ppm. In other embodiments of the invention, waxy rice flour made according to the disclosed methods has hexanal values of less than about 3.0 ppm after between two and four weeks storage, preferably less than about 2.0 ppm, and more preferably less than about 1.5 ppm.

In embodiments, the thermally inhibited grain flour contains less hexanal after zero days storage than flour that is thermally inhibited after milling. In one embodiment the thermally inhibited grain flour contains at least 50% less hexanal than flour thermally inhibited after milling after zero days' storage. In other embodiments flour thermally inhibited grain flour contains at least 60% less hexanal than flour thermally inhibited after milling after zero days' storage. In other embodiments flour made from thermally inhibited grain contains at least 80% less hexanal after milling than flour thermally inhibited after milling after zero days' storage. In other embodiments flour made from thermally inhibited grain contains about 85% less hexanal after milling than flour thermally inhibited after milling after zero days' storage. In embodiments this reduction in hexanal persists so that the thermally inhibit grain flour at 50%, more preferable 60%, more preferable 80%, and most preferably about 85% less hexanal than thermally inhibited flour after 2 or 4 weeks storage.

The flours and starches made according to the disclosed methods, whether or not further modified may be used in food products in the same way as other flours and starches, for example in baked goods, as food coatings, as thickeners and the like. The amount of flour used is in accordance with needs of the use.

The source of the grain, dehydrating conditions, heating time and temperature, initial pH, and whether or not moisture is present during the process steps are all variables that affect the degree of inhibition that can be obtained. All these factors are interrelated and an examination of the Examples will show the effect that these different variables have on controlling the degree of inhibition, as well as the textural and viscosity characteristics of the inhibited products. The following examples are provided as illustrations and should not be construed to limit the scope of the invention in any way. Persons of ordinary skill in the art will recognize that routine modifications may be made to the methods and materials used in the examples, which would still fall within the spirit and scope of the present invention.

PROCEDURES

Characterization of Inhibition by Brabender Viscosity Data

Measurement of a viscosity after it is dispersed in water and gelatinized is by Brabender® Micro Visco-Amylo-Graph® (manufactured by Brabender® GmbH & Co. KG, Duisburg, Germany). The Micro Visco-Amylo-Graph® records the torque required to balance the viscosity that develops when the starch or flour slurry is subjected to a programmed heating cycle. The record consists of a curve or pasting profile tracing the viscosity through the heating cycle in arbitrary units of measurement termed Brabender Units (BU).

Unless otherwise stated, the following paste viscosity procedure was used for all samples. Samples were slurried in a sufficient amount of distilled water to give 5% anhydrous solids flour or starch slurry (i.e. 5% solids that have a moisture content of less than 2%). The pH was adjusted to pH 3.0 with a sodium phosphate, citric acid buffer and the slurry introduced to the sample cup of a Brabender® Micro Visco-Amylo-Graph® fitted with a 350 cm/gram cartridge. The starch slurry was heated rapidly to 95° C. and held for 15 minutes. The peak viscosity and viscosity ten minutes after peak viscosity were recorded in Brabender Micro Visco Units (MVU). The percentage breakdown in viscosity was calculated according to the formula:

$$\% \text{ Breakdown} = \frac{\text{peak} - (\text{peak} - 10') \times 100}{\text{peak}}$$

where "peak" is the peak viscosity in MVU, and "(peak+10')" is the viscosity in MVU at ten minutes after peak viscosity.

If no peak viscosity is reached (i.e., the data indicate a rising curve or a flat curve), the viscosity at 95° C. and the viscosity at 65 minutes after attaining 95° C. were recorded. Other than the foregoing, the peak viscosity test was measured in accordance with International Association for Cereal Science and Technology Standard No. 169 (Approved: 2000)

Hexanal Analysis

Hexanal formation was measured using a homogenous (relative to granule size) flour sample mixed with water containing a defined standard for measuring hexanal. This mixture was heated in a heating block for a specified amount of time, after which time a sample of the headspace over the mixture was taken and injected into a gas chromatograph coupled with flame ionization detection (FID). Hexanal released into the headspace was quantified by comparison of the hexanal gas's chromatographic response to that of the defined standard. Hexanal levels were obtained from thermally inhibited flours stored at room temperature after 0, 2 and 4 weeks.

RESULTS

Example 1—Effect of Steeping on Thermal Inhibition of Grain

Waxy rice (dehulled and debranned) and waxy maize grains were thermally inhibited without buffering by heating the grains at 100° C. for 1 hour to dehydrate the grain to at least substantially anhydrous, followed by heat treating at either 130° C. for 2 hours. The heat-treated waxy grains were then ground (milled) into flours. Flours with similar particle sizes to flours from the heat-treated grains were prepared from untreated grains and then heat-treated at the same conditions. Viscosity profiles of the above non-buffered flours and starch are provided in FIG. 2.

For buffered grains and flours, waxy rice (dehulled and debranned) and waxy maize grains were steeped in potassium citrate solution (1.2%, w/w) at 50° C. for 24 hours. After draining and removing surface water, the grains were dried at 50° C. to moisture content of less than 12%. The dried grains were thermally inhibited by heating the grains to 100° C. for 1 hour to render them at least substantially anhydrous, and then to 140° C. for 2 hours. These heat-treated waxy grains were then ground (milled) into flours. Flours with similar particle sizes to flours from the heat-treated grains were prepared from untreated grains, sprayed with the same amount of potassium citrate as remaining in the grain, dried at 50° C. to moisture content below 12%, and then heat-treated at the same condition as for grains. Viscosity profiles of the above buffered flours and starch are provided in FIGS. 4 and 5. From those Figures it is seen that flours from thermally inhibited grains required a similar time of thermal treatment in order to have the same inhibition levels as those from direct thermal inhibition of flours.

Example 2—Effect of Thermal Inhibiting Grain on Rancidity of Flour

Three hundred (300) gram samples each of waxy rice grain, waxy rice flour, whole waxy corn grain and waxy corn flour were heat treated at various temperatures for various lengths of time. The sample grains and flours were dehydrated to substantially anhydrous and heat treated in a lab oven. The samples were loaded into the oven and brought from ambient temperature to 100° C. until the samples became at least substantially anhydrous, and were then further heated to the specified heat treating temperatures (e.g., 130° C. or 140° C.), with the temperature ramped up over a time of about 5 to 15 minutes, and held at those heat treating temperatures for a specified amount of time.

The waxy corn grain and waxy corn flour were not pH-adjusted. The waxy rice grain and waxy rice flour were pH adjusted as follows. For the grain, a 1:3 mixture of grain to 1.2% potassium citrate solution, and was preheated in water bath at 50° C. The grain was allowed to steep in the buffer for 24 hours. After 24 hours, the beaker was removed from the bath and the steep solution drained. The grain was then placed on a tray and dried in an oven at 50° C. overnight to a moisture content of less than 12%, based on total weight of the grain. For the flour, it was sprayed with the 1.2% potassium citrate solution in the same amount as remaining in the steeped grain, and then dried in an oven at 50° C. overnight to a moisture content of less than 12%, based on total weight of the flour. The dried grain and flour were then heat treated as described above for the waxy corn grain and waxy corn flour.

Processing conditions and storage stability are set forth in Table 3 below.

TABLE 1

Sample Processing Conditions and Resulting Stability

| | Process Variables | | | Hexanal (ppm) | | |
|---|---|---|---|---|---|---|
| Sample | pH | Temperature (° C.) | Time (min) | 0 week storage | 2 weeks storage | 4 weeks storage |
| WC [1] Flour | — | — | — | 1.5 | 1.5 | 1.8 |
| WC Flour-1 | — | 130 | 60 | 3.6 | 3.5 | 2.9 |
| WC Grain-1 | — | 130 | 60 | 1.1 | 1.0 | 1.0 |
| WC Flour-2 | — | 140 | 30 | 3.2 | 3.0 | 2.8 |
| WC Grain-2 | — | 140 | 60 | 1.0 | 0.9 | 0.8 |
| WC Flour-3 | — | 140 | 60 | 6.8 | 7.0 | 5.1 |
| WC Grain-3 | — | 140 | 120 | 1.0 | 1.0 | 0.9 |
| WR Flour | — | — | — | 3.6 | 2.9 | 2.6 |
| WR Flour-1 | 8.32 | 140 | 30 | 11.9 | 8.6 | 6.9 |
| WR Grain-1 | 8.32 | 140 | 30 | 2.2 | 1.6 | 1.4 |
| WR Flour-2 | 8.32 | 140 | 120 | 7.5 | 6.5 | 6.0 |
| WR Grain-2 | 8.32 | 140 | 120 | 3.0 | 2.3 | 1.5 |
| WR Flour-2 | 8.32 | 165 | 30 | 10.2 | 8.8 | 7.0 |
| WR Grain-2 | 8.32 | 165 | 30 | 3.2 | 2.6 | 1.6 |

[1] "WC" and "WR" are abbreviations for waxy corn and waxy rice. WC flour and WR flour are controls and were not thermally inhibited.

Samples were analyzed for rancidity by hexanal analysis, with the results provided in Table 1 above. It is seen that flour from thermally inhibited grain (both corn and rice) had a much reduced level of lipid oxidation compared to the thermally inhibited flours, at zero, two and four weeks. This illustrates that thermally inhibited grain flour had less hexanal, and so would be expected to be perceived to taste better than flour that was thermally inhibited after milling. It is also seen that the thermally inhibited grain flour had reduced hexanal levels at zero, two and four weeks than flour than the controls (i.e., non-thermally inhibited flours). This illustrates that thermally inhibited flours obtained from thermally inhibited grains have greater shelf life compared to flours that are thermally inhibited.

Example 3—Effect of Steeping on Thermal Inhibition

Nine samples of waxy rice grain (dehulled and debranned) were steeped in a buffer at various temperatures and then thermally inhibited for various amounts of time. The waxy rice grain samples were pH adjusted as follows. The waxy rice grain was pH-adjusted by adding 300 grams of the grain in a 1:3 mixture of grain to buffer to a 1.2% potassium citrate solution, and preheated in water bath at 50° C., 60° C. or 70° C. and covered. The grain was allowed to steep in the buffer for 24 hours. After 24 hours, the beaker was removed from the bath and the steep solution drained. The grain was then placed on a tray and dried in an oven at 50° C. overnight to a moisture content of less than 12% (w/w). The dried grain samples were then dehydrated (100° C.) to anhydrous or substantially anhydrous and then heat treated at the indicated temperature and for the indicated time.

TABLE 2

Steeping Prior to Thermal Inhibition

| | Process Variables | | | | |
|---|---|---|---|---|---|
| Sample | Buffer Temperature (° C.) [2] | pH after 24 h steeping | Moisture (%) | Temperature (° C.) | Time (min) |
| WR Grain [1] | — | — | 12.33 | — | — |
| WR Grain-1 | 50 | 5.82 | 6.53 | — | — |

TABLE 2-continued

Steeping Prior to Thermal Inhibition

| Sample | Process Variables | | | | |
|---|---|---|---|---|---|
| | Buffer Temperature (° C.)[2] | pH after 24 h steeping | Moisture (%) | Temperature (° C.) | Time (min) |
| WR Grain-2 | 60 | 5.82 | 7.07 | — | — |
| WR Grain-3 | 70 | 5.82 | 7.45 | — | — |
| WR Grain-4 | 50 | 5.82 | 4.50 | 140 | 60 |
| WR Grain-5 | 60 | 5.82 | 3.38 | 140 | 60 |
| WR Grain-6 | 70 | 5.82 | 3.89 | 140 | 60 |
| WR Grain-7 | 50 | 5.82 | 3.30 | 140 | 120 |
| WR Grain-8 | 60 | 5.82 | 3.47 | 140 | 120 |
| WR Grain-9 | 70 | 5.82 | 2.85 | 140 | 120 |

[1] Waxy rice (WR) Grain is a control and was not thermally inhibited or buffered.
[2] Other than the control, all grain samples were steeped in buffer (1.2% potassium citrate) for 24 hours at the temperatures listed above. WR Grain-1, WR Grain-2 and WR Grain-3 were buffered but not heat treated.

After buffering and inhibiting the grain samples, each sample was milled to pass through an 80 mesh sieve. Viscosities of the samples were determined according to the paste viscosity test procedure described above. The results are provided in Table 3 below.

TABLE 3

Paste Viscosities

| Sample | Peak Viscosity (MVU) | End Viscosity (MVU) |
|---|---|---|
| WR Grain | 286 | 146 |
| WR Grain-1[1] | — | — |
| WR Grain-2 | — | — |
| WR Grain-3 | — | — |
| WR Grain-4 | 219 | 219 |
| WR Grain-5 | 155 | 155 |
| WR Grain-6 | 238 | 238 |
| WR Grain-7 | 173 | 173 |
| WR Grain-8 | 102 | 102 |
| WR Grain-9 | 202 | 202 |

[1] Viscosities of the flours from the buffered, non-thermally treated waxy rice grains were substantially the same as that for the control.

Example 4—Color of Thermally Inhibited Flours

Color of waxy rice grain thermally inhibited (heating 2 h at 140° C.) and milled to obtain flour was compared to thermally inhibited waxy rice flour that was milled prior to inhibition. Color was measured using a colorimeter and in Table 4 is reported using L* value and Yellowness Index (YI).

TABLE 4

Color of Thermally Inhibited Flours

| Sample | L* | YI |
|---|---|---|
| Waxy rice flour sprayed with buffer, 2 h@140° C. | 88.0 | 25.0 |
| Waxy rice grain steeped with buffer, 2 h@140° C. | 92.2 | 12.7 |

As seen in Table 4, thermally inhibited flour obtained from thermally inhibited grain had higher L* value and lower yellowness index. Indicating the color is lighter (higher L* value) and less yellow.

The above Examples and their results illustrate that thermally inhibited flours and starches can be produced by thermally inhibiting the grain prior to milling. Further, the grains can be buffered to further modify the degree of inhibition. Thermally inhibited flours produced by this method have improved color versus flours that are thermally inhibited after milling. Further, thermally inhibited corn flour produced by this method exhibited a pleasant smell compared to corn flour that is thermally inhibited after milling. Finally, by thermally inhibiting grain prior to milling, the resultant thermally inhibited flour has an improved shelf life versus flour that is thermally inhibited after milling.

We claim:

1. A method of preparing thermally inhibited starch comprising:
    providing a polished grain;
    steeping the polished grain in a citrate buffer solution wherein the citrate buffer is in the solution in an amount less than about 5% but more than 0.1% by weight of the solution to form a buffered grain comprising citrate;
    soaking the buffered grain in an acidic solution having pH from about 5.5 to about 6.5;
    after soaking in the acidic solution, dehydrating the grain to anhydrous or substantially anhydrous at a first temperature to form a dehydrated grain;
    heat treating the dehydrated grain at a second temperature that is higher than the first temperature for a time from about 1 hour to not more than 6 hours to form a heat-treated dehydrated grain such that after milling a thermally inhibited starch is obtained;
    wet milling the heat-treated dehydrated grain to obtain a thermally inhibited starch; and drying the starch.

2. The method according to claim 1, wherein the grain is dehydrated to be anhydrous.

3. The method according to claim 1, wherein the grain is dehydrated to be substantially anhydrous.

4. The method according to claim 1, wherein the dehydration step is carried out by heating the grain at a temperature of between about 80° C. and about 100° C.

5. The method according to claim 1 wherein the heat treating is carried out at a temperature of about 120° C. to about 180° C. from about 1 hour to not more than 6 hours.

6. The method according to claim 1 wherein the heat treating is carried out at a temperature of about 130° C. to about 165° C. from about 1 hour to not more than 6 hours.

7. The method of claim 1, wherein the starch is not washed or remoistened following wet milling.

8. A method of preparing thermally inhibited starch comprising:
    providing a grain;
    steeping the grain in a citrate buffer solution to form a buffered grain comprising citrate wherein the citrate buffer in the solution is in an amount less than about 5% but more than 0.1% by weight of the solution;
    soaking the buffered grain in an acidic solution having pH from about 5.5 to about 6.5;
    following soaking in the acidic solution, dehydrating the grain to anhydrous or substantially anhydrous at a first temperature;
    heat treating the dehydrated grain at a second temperature that is higher than the first temperature for a time from about 1 hour to not more than 6 hours to form a heat-treated dehydrated grain such that after milling, a thermally inhibited starch is obtained;
    wet milling the heat treated, dehydrated grain to obtain a thermally inhibited starch; and drying the starch wherein the starch is not washed or remoistened following wet milling.

9. The method according to claim 8, wherein the grain is dehydrated to be anhydrous.

10. The method according to claim 8, wherein the grain is dehydrated to be substantially anhydrous.

11. The method according to claim 8, wherein the thermal dehydration step is carried out by heating the grain at a temperature of between about 80° C. and about 100° C.

12. The method according to claim 8 wherein the heat treating is carried out at a temperature of about 120° C. to about 180° C. from about 1 hour to not more than 6 hours.

13. The method according to claim 8 wherein the heat treating is carried out at a temperature of about 130° C. to about 165° C. from about 1 hour to not more than 6 hours.

* * * * *